(12) United States Patent
Eddy (10) Patent No.: US 9,266,622 B2
(45) Date of Patent: Feb. 23, 2016

(54) PRECIPITATION STATIC CHARGE DRAIN SYSTEM FOR AN AIRCRAFT WINDOW

(71) Applicant: Cessna Aircraft Company, Wichita, KS (US)

(72) Inventor: Stephen Eddy, Derby, KS (US)

(73) Assignee: TEXTRON INNOVATIONS, INC., Providence, RI (US)

( * ) Notice: Subject to any disclaimer, the term of this patent is extended or adjusted under 35 U.S.C. 154(b) by 183 days.

(21) Appl. No.: 13/645,772

(22) Filed: Oct. 5, 2012

(65) Prior Publication Data

US 2013/0087655 A1  Apr. 11, 2013

Related U.S. Application Data

(60) Provisional application No. 61/543,664, filed on Oct. 5, 2011.

(51) Int. Cl.
*B64C 1/14* (2006.01)
*B64D 45/02* (2006.01)

(52) U.S. Cl.
CPC .............. *B64D 45/02* (2013.01); *B64C 1/1492* (2013.01)

(58) Field of Classification Search
CPC ...... B64B 45/02; B64B 37/32; B64C 1/1484; B64C 1/14; H05F 3/00; H05F 1/00
USPC ................ 244/129.3, 129.4, 129.5, 121, 1 A; 361/218; 428/38
See application file for complete search history.

(56) References Cited

U.S. PATENT DOCUMENTS

| | | | |
|---|---|---|---|
| 2,416,202 A * | 2/1947 | Naumann | 361/212 |
| 3,801,418 A * | 4/1974 | Cornelis et al. | 428/38 |
| 4,078,107 A * | 3/1978 | Bitterice et al. | 428/38 |
| 4,128,448 A * | 12/1978 | Bitterice et al. | 156/166 |
| 4,323,946 A | 4/1982 | Traux | |
| 4,590,535 A | 5/1986 | Mang | |
| 4,755,659 A * | 7/1988 | Leon et al. | 219/547 |
| 4,782,426 A | 11/1988 | DeCamp et al. | |
| 4,831,491 A | 5/1989 | Mueller et al. | |
| 5,650,208 A | 7/1997 | Chaussade et al. | |
| 7,864,501 B2 * | 1/2011 | Rawlings et al. | 361/216 |
| 2010/0025533 A1* | 2/2010 | Bimanand et al. | 244/121 |
| 2012/0019973 A1* | 1/2012 | Ehrmantraut et al. | 361/218 |

* cited by examiner

*Primary Examiner* — Benjamin P Lee
(74) *Attorney, Agent, or Firm* — Lathrop & Gage LLP (57) ABSTRACT

A static charge drain system for an aircraft window includes a resistive probe penetrating an outer ply of the aircraft window, a first end of the probe being exposed at an outer surface of the outer ply of the aircraft window. A second end of the probe penetrates an inner surface of the outer ply of the aircraft window. A conductive drain element is disposed between the outer ply of the aircraft window and an inner ply of the aircraft window and is electrically connected between the second end of the probe and a ground point of the aircraft window.

15 Claims, 6 Drawing Sheets

PRECIPITATION STATIC CHARGE DRAIN SYSTEM FOR AN AIRCRAFT WINDOW

CROSS-REFERENCE TO RELATED APPLICATION

This nonprovisional application is based on U.S. Provisional Patent Application No. 61/543,664, filed in the U.S. Patent and Trademark Office on Oct. 5, 2011, the entire contents of which are incorporated herein by reference.

BACKGROUND

1. Technical Field

This disclosure relates to aircraft windows and windshields, and, in particular, to a system for draining, dissipating or discharging static charge, such as precipitation static (p-static) charge, from an aircraft window or windshield, while not providing a significant ground path for lightning strikes.

2. Discussion of Related Art

Windows and windshields used in aircraft typically include multiple glass and/or plastic layers or plies which are fused or laminated together to form a composite transparent window. It is noted that throughout this disclosure, the terms "window" and "windshield" are interchangeable and will be used as if they are interchangeable, unless indicated otherwise, either explicitly or implicitly by the context. During aircraft flight, fog, mist, water, ice, etc., can be deposited on the outside surface of the window. In order to remove these, aircraft windshields typically include an internal electrical device for heating the windshield. In addition to fog, water, mist, ice, etc., static electric charge also collects on the outside surface of an aircraft window during flight. If allowed to build up, the static charge reaches an electric potential sufficient to discharge through the window to the interior heating device.

This electrical discharge often punctures small holes in the outer ply of the window. In extreme cases, depending on the dielectric strength of the window material, a relatively high voltage discharge can result in sufficient localized heat to severely damage the window in the vicinity of the discharge path. Furthermore, when the discharge is through the outer ply and into the heating device, the heating device and other associated electrical components can be severely damaged. It is therefore desirable to provide some facility for dissipating static charge before it reaches an electric potential sufficient to discharge through the window.

Highly conductive or low-resistance wires can be used to connect the outside surface of the window to aircraft ground to dissipate or discharge the static ground. Unfortunately, such wires also present a ground to lightning. That is, as a result of lightning strikes seeking low-resistance paths to ground, these conductive paths can ground extremely high currents into the window and the window heater electrical system, which can cause permanent damage to the window and the window controller or any protective shunts in the system.

SUMMARY

According to one aspect, a static charge drain system for an aircraft window is provided. A resistive probe penetrates an outer ply of the aircraft window, a first end of the probe being exposed at an outer surface of the outer ply of the aircraft window. A second end of the probe penetrates an inner surface of the outer ply of the aircraft window. A conductive drain element is disposed between the outer ply of the aircraft window and an inner ply of the aircraft window and is electrically connected between the second end of the probe and a ground point of the aircraft window.

According to another aspect, an aircraft window is provided. The aircraft window includes an outer ply and an inner ply. A resistive probe penetrates the outer ply, a first end of the probe being exposed at an outer surface of the outer ply. A second end of the probe penetrates an inner surface of the outer ply. A conductive drain element is disposed between the outer ply and the inner ply and is electrically connected between the second end of the probe and a ground point of the aircraft window.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions and features may be exaggerated for clarity.

DETAILED DESCRIPTION

This disclosure is directed to a laminate window precipitation static (P-static) drain system, which is applied in some exemplary embodiments to an aircraft window and/or windshield. The window can be a composite of multiple glass and/or plastic layers or plies. The system includes one or more drain probes and one or more drain paths. In some embodiments, the drain path(s) can include one or more wires. In some embodiments, the drain path(s) can include one or more conductive coatings, layers or films formed over the inner surface of an outer ply of the window. The drain probes are disposed in the outermost ply, i.e., the outer or outboard ply, of the plastic window or windshield. The longitudinal axes of the probes are oriented substantially normal to the outside surface of the window, i.e., the outer ply. In some exemplary embodiments, the outer tips of the probes are disposed to be flush with the outer surface of the window, i.e., the outer ply.

In some exemplary embodiments, the probes are of sufficient length such that the inner ends or tips of the probes extend into the window laminate a distance sufficient for attachment of a drain path, which can be a wire coiled around the probe near the inner end of the probe. Alternatively, where the drain path is a coating, layer or film, the inner end of the probe need only penetrate the outer ply a sufficient distance to make contact with the coating, layer or film on the inner surface of the outer ply. The drain path is disposed within the window laminate and runs generally parallel to the inner surface of the window from the drain probe to an edge of the window. The drain path is terminated to windshield ground or aircraft ground at the edge of the window as appropriate for the specific window in which the system is implemented.

According to the present disclosure, the probe outer end or tip is exposed to outside air and any static electric charge on the windshield surface. The probe is long enough to extend to an inner layer of the laminated windshield assembly. At the inner end of the probe, in some exemplary embodiments, a small filament wire (drain wire) is attached to the probe, in an electrically conductive manner, to provide a drain path from the probe to aircraft ground. In other exemplary embodiments, the inner end of the probe makes contact with the conductive coating, layer or film. The drain path, i.e., wire or film, grounds to the windshield surround or frame in a manner that is appropriate for and suited to the particular windshield type and installation type.

When static is present on the windshield surface and reaches a high enough voltage level, it will discharge through the probe and drain path assembly to ground. The quantity of drain probe and drain path assemblies placed into the windshield can be varied and optimized to provide adequate static protection as required.

Figure 1:
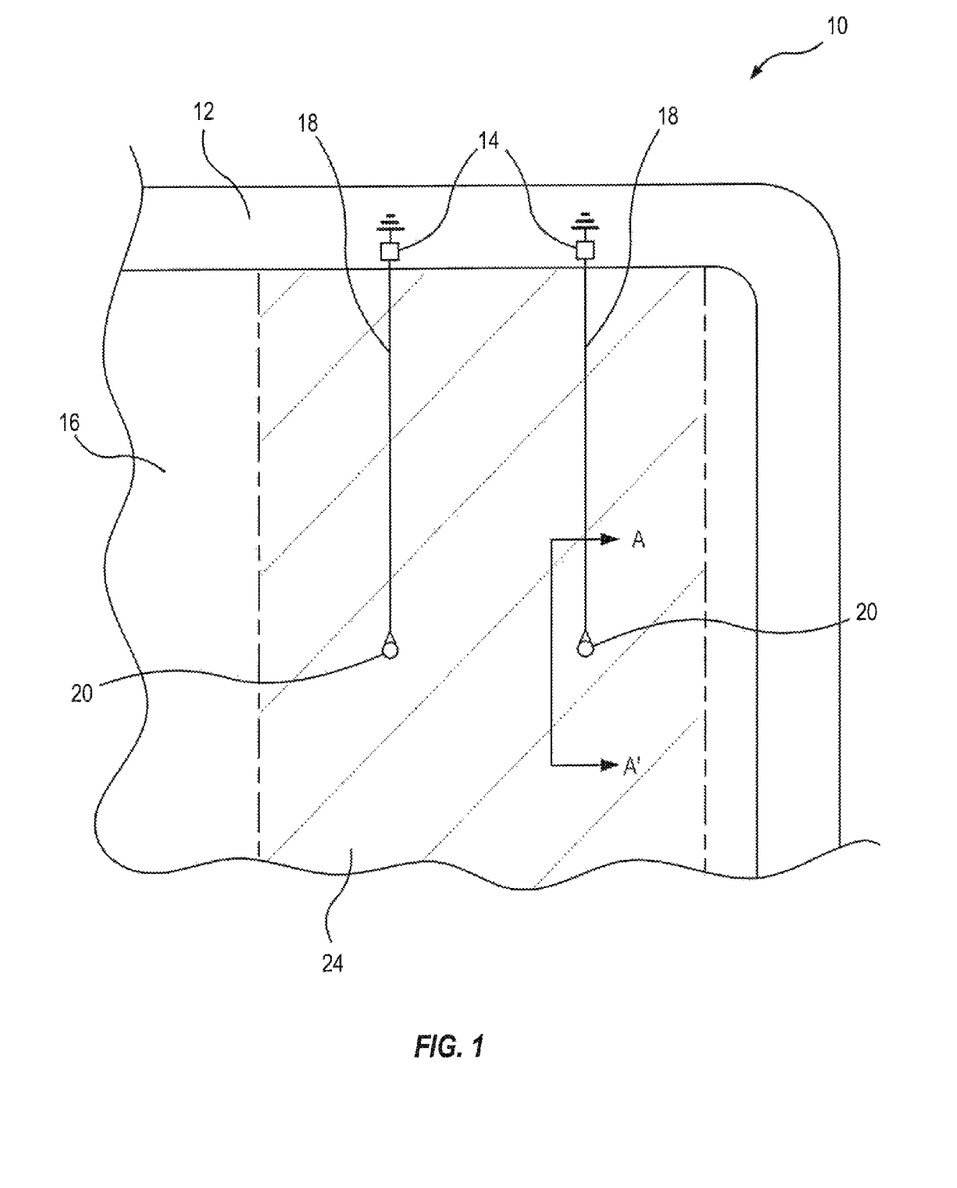
FIG. 1 is a schematic top plan view of a portion of an aircraft window or windshield, according to some exemplary embodiments.
Figure 2:
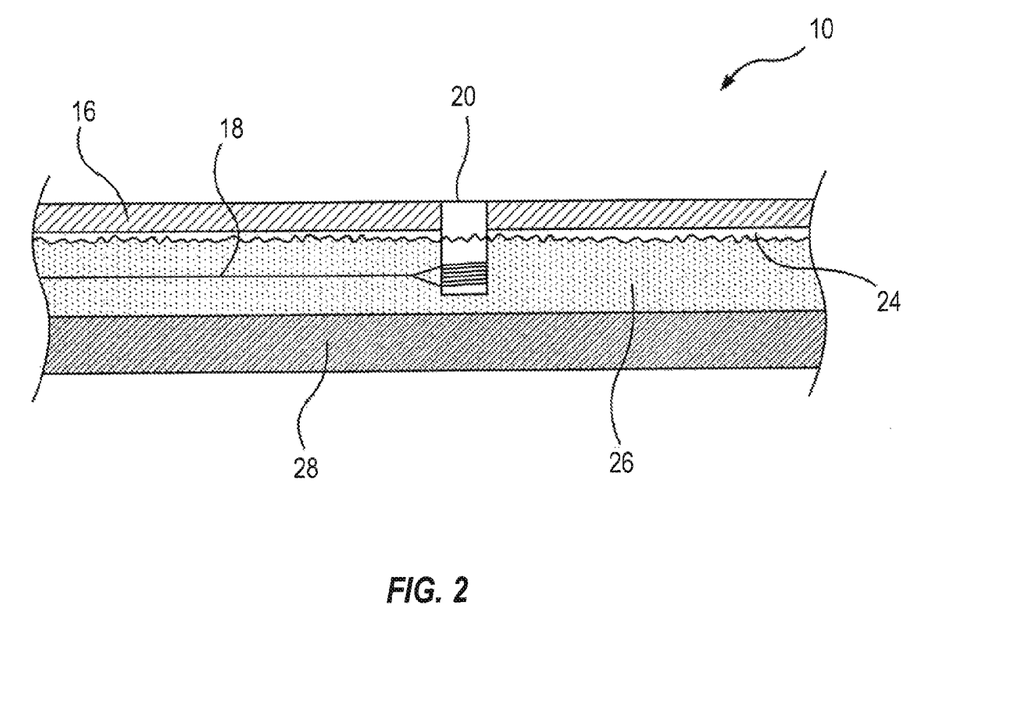
FIG. 2 is a schematic cross-sectional view taken along line A-A' of FIG. 1.

FIG. 1 is a schematic top plan view of a portion of an aircraft window or windshield, according to some exemplary embodiments. FIG. 2 is a schematic cross-sectional view taken along line A-A' of FIG. 1.

Referring to FIGS. 1 and 2, the windshield 10 includes a windshield edge or frame 12, which is electrically conductively coupled to window ground and/or aircraft ground. In some exemplary embodiments, the windshield 10 is a laminated composite aircraft transparency structure of at least two plastic or acrylic plies, which include an outer or outboard acrylic or plastic ply 16 and an inner or inboard acrylic or plastic ply 28 with a transparent interlayer material 26 disposed between the two plies 16 and 28.

The windshield 10 is heated to provide for the removal of fog, water, mist, ice, etc., which may accumulate on the windshield 10 during flight. The illustrated exemplary embodiment includes a resistive film heater element 24 mounted to the inboard surface of the outboard ply 16. It should be noted that the heater element 24 need not be a film heater, but may alternatively be a resistive wire heater element. The present disclosure is applicable to any type of windshield heater configuration.

According to exemplary embodiments, a plurality of probes 20 is installed to penetrate the outer ply 16, the heater element 24 and a portion of the interlayer material 26. It should be noted that although FIG. 1 illustrates two probes 20, the present disclosure is applicable to any number of probes 20 installed in the windshield 10. In particular exemplary embodiments, the outer or outboard ends or tips of the probes 20 are flush with the outer or outboard surface of the outer ply 16, as illustrated in FIG. 2. The lengths of the probes 20 are selected such that the inner or inboard ends of the probes are located within the interlayer material 26. This allows for the drain wires 18 to be attached in an electrically conductive manner to the probes 20 near the inner ends of the probes 20 within the interlayer material 26. In some exemplary embodiments, the drain wires 18 are coiled around the probes 20 as shown to ensure that the electrically conductive contact with the probes 20 is maintained in the contemplated aircraft flight environment. The drain wires 18 run generally parallel to the inner surface of the outboard ply 16 as shown to the edge or frame 12 of the windshield 10. At the edge or frame 12 of the windshield 10, the drain wires are connected in an electrically conductive manner to ground points 14, which are connected in an electrically conductive manner to window and/or aircraft ground.

Figure 3:
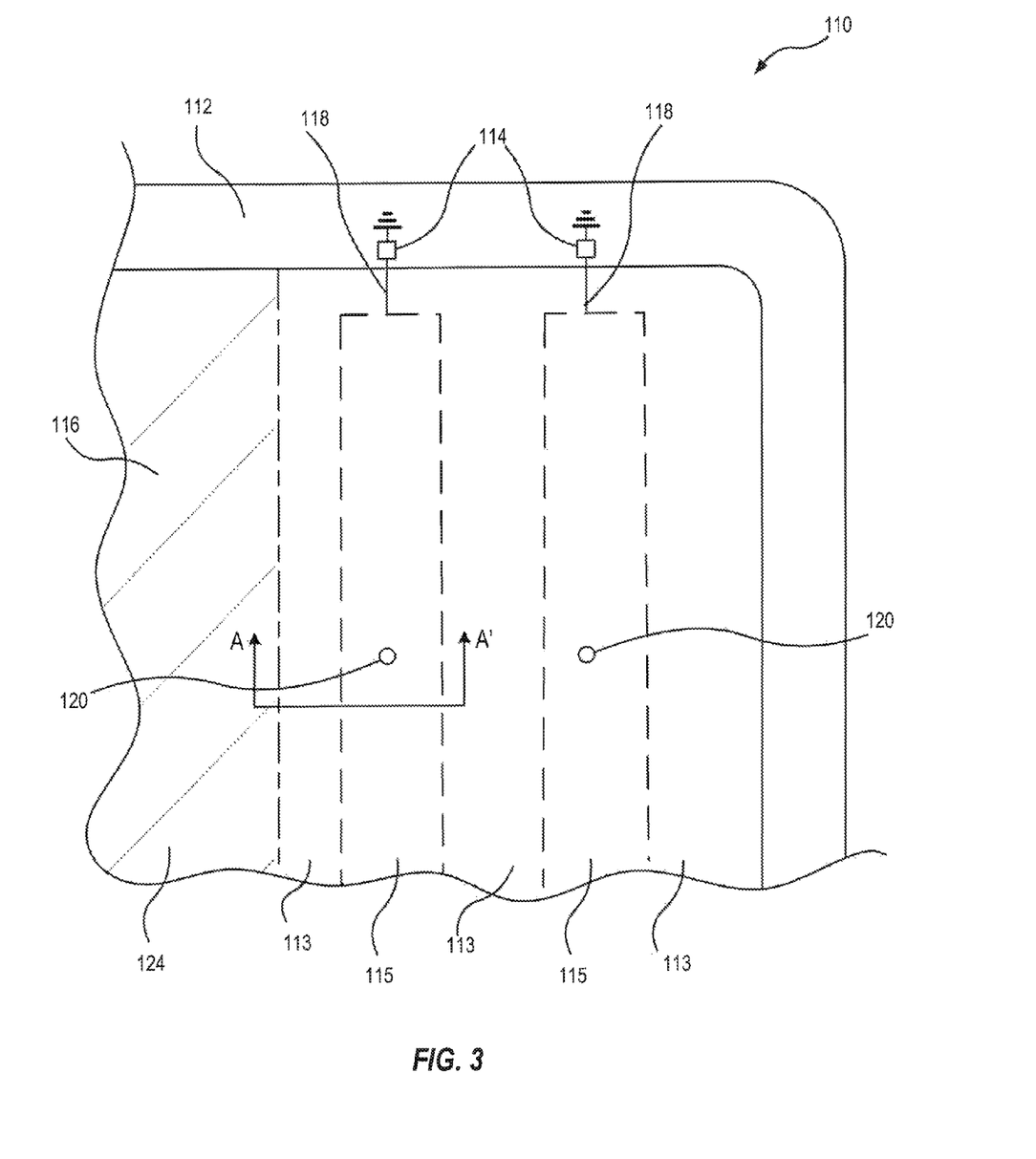
FIG. 3 is a schematic top plan view of a portion of an aircraft window or windshield, according to some exemplary embodiments.
Figure 4:
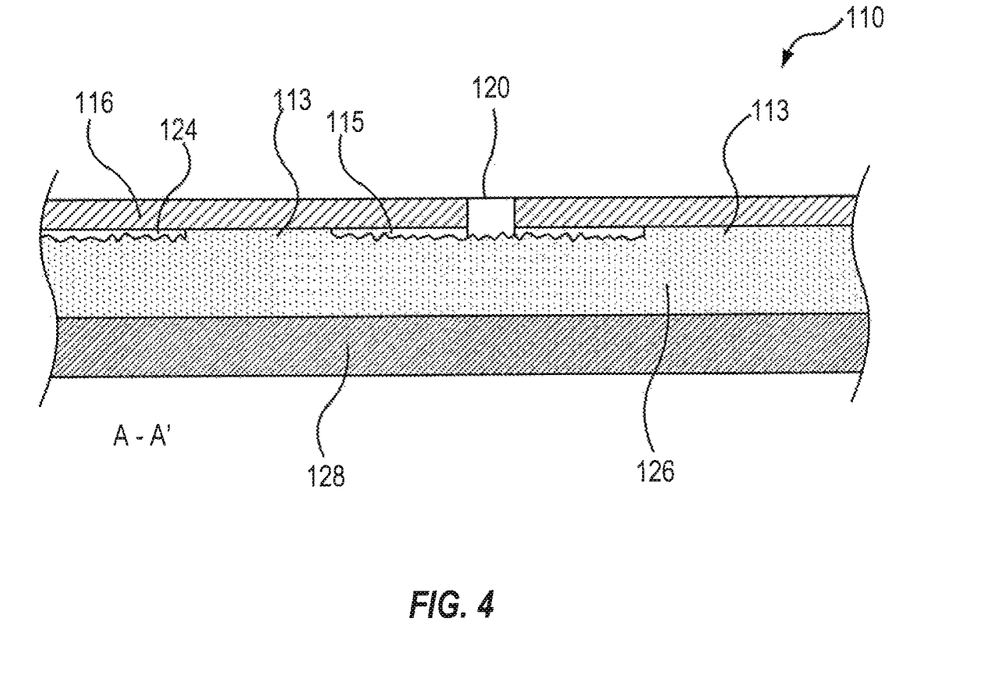
FIG. 4 is a schematic cross-sectional view taken along line A-A' of FIG. 3.

FIG. 3 is a schematic top plan view of a portion of an aircraft window or windshield, according to other exemplary embodiments. FIG. 4 is a schematic cross-sectional view taken along line A-A' of FIG. 3.

Referring to FIGS. 3 and 4, the windshield 110 includes a windshield edge or frame 112, which is electrically conductively coupled to window ground and/or aircraft ground. In some exemplary embodiments, the windshield 110 is a laminated composite aircraft transparency structure of at least two plastic or acrylic plies, which include an outer or outboard acrylic or plastic ply 116 and an inner or inboard acrylic or plastic ply 128 with a transparent interlayer material 126 disposed between the two plies 116 and 128.

The windshield 110 is heated to provide for the removal of fog, water, mist, ice, etc., which may accumulate on the windshield 110 during flight. The illustrated exemplary embodiment includes a resistive film heater element 124 mounted to the inboard surface of the outboard ply 116. It should be noted that the heater element 124 need not be a film heater, but may alternatively be a resistive wire heater element. The present disclosure is applicable to any type of windshield heater configuration.

According to exemplary embodiments, a plurality of probes 120 are installed to penetrate the outer ply 116, where they make contact with conductive drain coatings, layers or films 115, which are disposed on the inner surface of the outer ply 116. Thus, the film heater element 124 and the drain films 115 can be formed on the inner surface of the outer ply 116 with one or more insulating gaps 113 disposed between them. In some exemplary embodiments, the heater film 124 and drain films 115 can be made of the same material and can be formed on the inner surface of the outer ply simultaneously in a single process step. It should be noted that although FIG. 3 illustrates two probes 120, the present disclosure is applicable to any number of probes 120 installed in the windshield 110.

In particular exemplary embodiments, the outer or outboard ends or tips of the probes 120 are flush with the outer or outboard surface of the outer ply 116, as illustrated in FIG. 4. The lengths of the probes 120 are selected such that the inner or inboard ends of the probes are located in contact with the drain film 115. The drain films 115 run generally parallel to the inner surface of the outboard ply 116 as shown to the edge or frame 112 of the windshield 110. At the edge or frame 112 of the windshield 110, the drain films 115 are connected in an electrically conductive manner, for example, by wires 118, to ground points 114, which are connected in an electrically conductive manner to window and/or aircraft ground.

Figure 5:
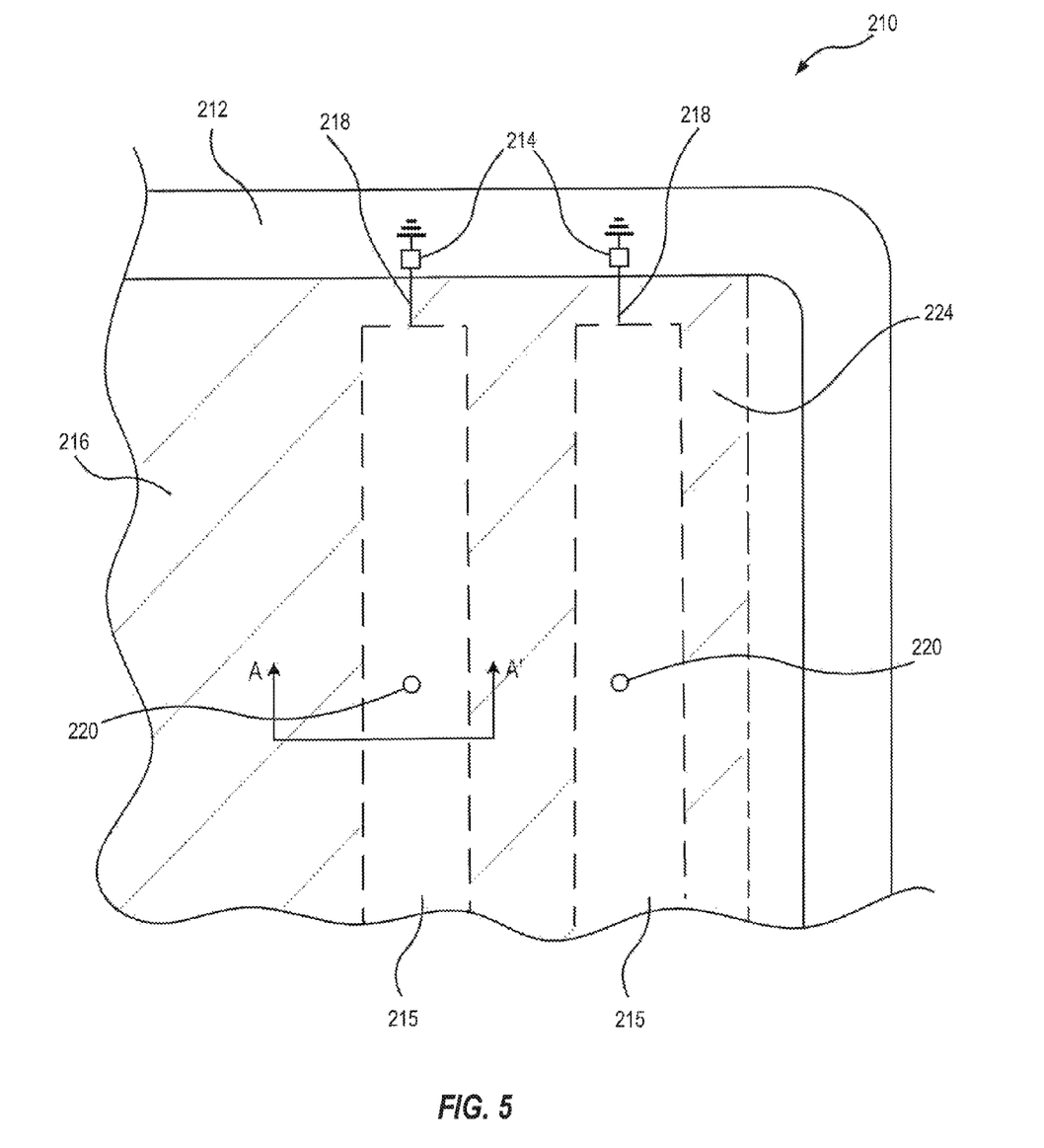
FIG. 5 is a schematic top plan view of a portion of an aircraft window or windshield, according to some exemplary embodiments.
Figure 6:
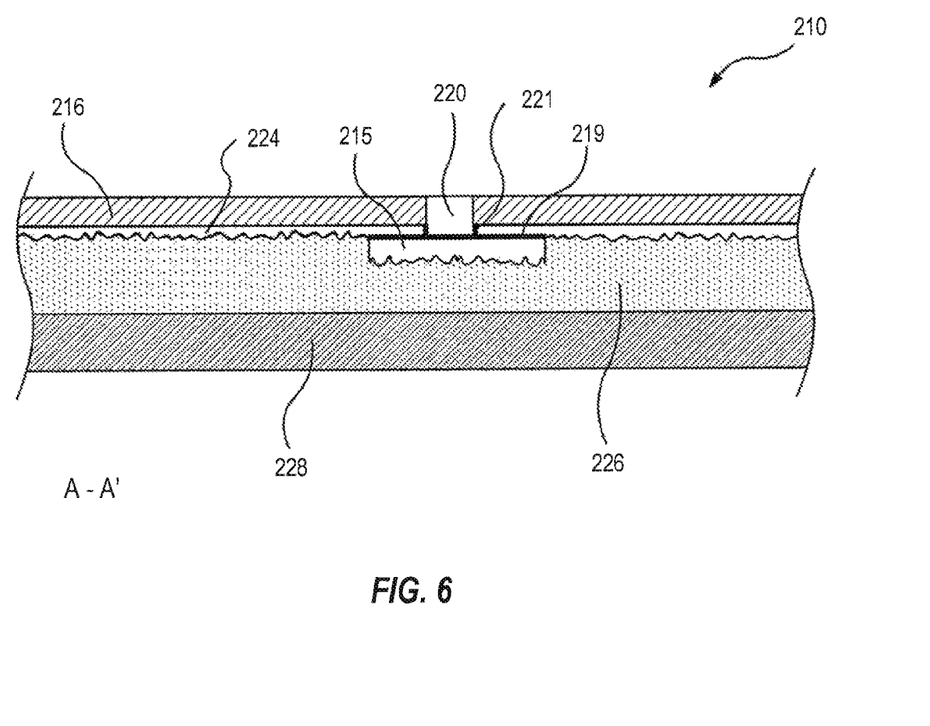
FIG. 6 is a schematic cross-sectional view taken along line A-A' of FIG. 5.

FIG. 5 is a schematic top plan view of a portion of an aircraft window or windshield, according to other exemplary embodiments. FIG. 6 is a schematic cross-sectional view taken along line A-A' of FIG. 5.

Referring to FIGs. and 6, the windshield 210 includes a windshield edge or frame 212, which is electrically conductively coupled to window ground and/or aircraft ground. In some exemplary embodiments, the windshield 210 is a laminated composite aircraft transparency structure of at least two plastic or acrylic plies, which include an outer or outboard acrylic or plastic ply 216 and an inner or inboard acrylic or plastic ply 228 with a transparent interlayer material 226 disposed between the two plies 216 and 228.

The windshield 210 is heated to provide for the removal of fog, water, mist, ice, etc., which may accumulate on the windshield 210 during flight. The illustrated exemplary embodiment includes a resistive film heater element 224 mounted to the inboard surface of the outboard ply 216. It should be noted that the heater element 224 need not be a film heater, but may alternatively be a resistive wire heater element. The present disclosure is applicable to any type of windshield heater configuration.

According to exemplary embodiments, a plurality of probes 220 are installed to penetrate the outer ply 216, and the film heater element 224, where they make contact with conductive drain coatings, layers or films 215, which are disposed on the inner surface of the film heater 224. In some exemplary embodiments, an insulating film 219 is formed between the heater film 224 and the drain film 215 to electrically isolate them. Also, to isolate the heater film 224 from the probe 220, a ring of insulating material 221 can be formed where the probe 220 penetrates the heater film 224.

In some exemplary embodiments, the heater film 224 and drain films 215 can be made of the same material. It should be noted that although FIG. 5 illustrates two probes 220, the present disclosure is applicable to any number of probes 120 installed in the windshield 210.

In particular exemplary embodiments, the outer or outboard ends or tips of the probes 220 are flush with the outer or outboard surface of the outer ply 216, as illustrated in FIG. 6. The lengths of the probes 220 are selected such that the inner or inboard ends of the probes are located in contact with the drain film 215. The drain films 215 run generally parallel to the inner surface of the outboard ply 216 as shown to the edge or frame 212 of the windshield 210. At the edge or frame 212 of the windshield 210, the drain films 215 are connected in an electrically conductive manner, for example, by wires 218, to ground points 214, which are connected in an electrically conductive manner to window and/or aircraft ground.

It should be noted that, in some exemplary embodiments, the probes 20, 120, 220 and drain paths 18, 115, 215 are electrically connected to windshield/aircraft ground, and not to the heater power return. As a result, potential high-voltage ripples caused by currents in the heater return lines are avoided.

As described above, the outer tips of the probes 20, 120, 220, which are flush with the outside surface of the outboard window ply 16, 116, 216 are exposed to the outside air. During aircraft flight, when static charge builds to a certain level and creates a certain static potential, the probes 20, 120, 220 and drain wires 18, 115, 215 conduct current and discharge the static charge to ground.

In some exemplary embodiments, the probes 20, 120, 220 of the present disclosure are not direct short circuits to ground. That is, the probes 20, 120, 220 have some predetermined resistance. In some exemplary embodiments, the probes 20, 120, 220 have a resistance in a range of 1.0 to 10.0 Megohms. In some particular exemplary embodiments, the probes 20 120, 220 have a resistance in the range of 7.0 to 10.0 Megohms. This resistance range allows for the drainage or dissipation of static charge, but will not be seen by potential lightning strikes as a low-resistance ground. Lightning across the windshield will not attach to the drain probes 20, 120, 220 and will not result in damage to the windshield or heater system, or other damage which lightning strikes may cause.

According to some exemplary embodiments, the probes 20, 120, 220 and/or drain paths 18, 115, 215 of the disclosure can be made from or include different materials for providing the resistive connection from the outer surface of the windshield to ground. For example, the probes 20, 120, 220 can have a carbon-based formulation, a metallic-based formulation or a plastic-based formulation. Within each of these categories, various types of probes can be generated, according to exemplary embodiments. For example, the carbon-based probes 20, 120, 220 can include a thin layer of carbon powder bonded to the surface of an insulating rod. Alternatively, the carbon-based probes 20, 120, 220 can include epoxy impregnated with carbon in connection with an insulative weave. Alternatively, the carbon-based probes 20, 120 220 can include a hollow insulative rod with interior carbon lining and a metallic or carbon tip for protrusion through the outer plastic transparency ply 16, 116, 216.

Plastic formulations for the probes 20, 120, 220 can include one or more of polyamide-imide, polytetrafluoroethylene (PTFE), polyetheretherketone (carbon reinforced), polyetherimide, acetal, acetal copolymer, polypropylene, and acrylonitrile-butadiene-styrene. The probes 20, 120, 220 may also include metallic, carbon and/or semi-conductive impregnated carriers such as various forms of epoxies and acrylics that may be formed in place.

The probe system of the present disclosure allows static charge to drain from the window or windshield without the use of external wires, coatings, or films that may be damaged or eroded over time, and that also prevent or inhibit standard repairs and polishing on the windshield surface. The outer tips of the probes of the present disclosure are substantially flush with the outer surface of the outboard windshield ply. As a result, the windshield material can be cleaned, polished or otherwise maintained along with the probe tip material. The probe drain system of the present disclosure also allows current maintenance techniques and practices to remain in place with no changes. Also, the system of the present disclosure can be incorporated into current windshield assembly processes with no special processes or tooling.

In some exemplary embodiments, the probe of the present disclosure allows for selection of a probe length that will transfer the drain path deep enough into the windshield to prevent interference with heater elements that may be placed adjacent or in close proximity to the inner surface of the plastic face or outer ply. The probe depth allows the drain wire to be electrically separated and isolated from the heater element on a separate level within the windshield. In a case in which the heater is directly adjacent to a probe location, the probe may be insulated, or a small "blackout" region may be created in the heater directly adjacent to the probe location. That is, the heater may be interrupted in the region directly adjacent to the probe location. Accordingly, the probe 20, 120, 220 of the present disclosure can be used with a wire filament type windshield heater or a film type windshield heater.

According to exemplary embodiments, the system of the present disclosure includes components that are small enough such that they do not visually distract the pilot. In some particular exemplary embodiments, the drain probe diameter can be approximately the size of a 20 to 24 gauge wire and is typically less than 0.100 inch in length. The drain filament wire that may be used can be no larger than the filaments used in the wire heaters of conventional heated aircraft windshields and can have a diameter less than that of a human hair. Drain coatings, layers or films can be sufficiently transparent to meet regulatory light transmission requirements and are typically undetectable to the pilot.

According to some exemplary embodiments, the drain path coatings, layers or films 115, 215 can be formed of, for example, any clear, conductive or semi-conductive materials that can be electrically connected or bonded to the probes 20, 120, 220. For example, the drain path coatings, layers or films 115, 215 can include a thin metal film which includes, for example, indium tin oxide, gold, silver, electrically doped polysiloxanes, and/or electrically doped epoxies.

According to some exemplary embodiments, an isolation element, such as insulating film 219 and ring of insulating material 221, can be formed of any clear non-conductive material that may be applied through spray application or in sheet form to the inner surface of outer ply 16, 116, 216 and/or probes 20, 120, 220. For example, the isolation material can include urethane, polyvinyl butyral (PVB), polysiloxane (non-doped), and/or other such material.

According to some exemplary embodiments, the probes 20, 120, 220, can be formed separately from the outer ply 16, 116, 216. In these embodiments, the probes 20, 120, 220 can be formed in place in holes or cavities in the ply 16, 116, 216, or can be preformed prior to assembly into the outer ply 16, 116, 216, such as by press fitting. In other exemplary embodiments, the probes 20, 120, 220 can be cast or molded in place in the outer ply 16, 116, 216.

While the present disclosure has shown and described exemplary embodiments, it will be understood by those of ordinary skill in the art that various changes in form and details may be made therein without departing from the spirit and scope of the present disclosure, as defined by the following claims.

What is claimed is:

1. A static charge drain system for an aircraft window, comprising:
   a resistive probe penetrating an outer ply of the aircraft window, a first end of the probe being exposed at an outer surface of the outer ply of the aircraft window, a second end of the probe penetrating an inner surface of the outer ply of the aircraft window;
   a conductive drain element disposed between the outer ply of the aircraft window and an inner ply of the aircraft window and being electrically connected between the second end of the probe and a ground point of the aircraft window; and
   a heating element disposed between the outer ply of the aircraft window and the inner ply of the aircraft window, wherein the heating element is electrically connected to the conductive drain element.

2. The static charge drain system of claim 1, wherein the first end of the probe is substantially flush with the outer surface of the outer ply of the aircraft window.

3. The static charge drain system of claim 1, wherein the conductive drain element comprises a conductive wire between the second end of the probe and the ground point of the aircraft window.

4. The static charge drain system of claim 1, wherein the conductive drain element comprises a conductive film between the second end of the probe and the ground point of the aircraft window.

5. The static charge drain system of claim 4, wherein the conductive film is a coating formed over the inner surface of the outer ply of the aircraft window.

6. The static charge drain system of claim 1, wherein the heating element comprises a resistive film formed over the inner surface of the outer ply of the aircraft window.

7. The static charge drain system of claim 6, wherein the second end of the probe penetrates the heating element into a region between the outer ply of the aircraft window and the inner ply of the aircraft window.

8. The static charge drain system of claim 1, wherein the probe comprises at least one of plastic, epoxy, carbon, a metal, and a combination of any of plastic, epoxy, carbon, and a metal.

9. An aircraft window, comprising:
   an outer ply;
   an inner ply;
   a resistive probe penetrating the outer ply, a first end of the probe being exposed at an outer surface of the outer ply, a second end of the probe penetrating an inner surface of the outer ply;
   a conductive drain film electrically disposed between the outer ply and the inner ply and being electrically connected between the second end of the probe and a ground point of the aircraft window; and
   a resistive heating film disposed between the outer ply of the aircraft window and the inner ply of the aircraft window wherein,
   the resistive heating film is electrically connected to the conductive drain film.

10. The static charge drain system of claim 9, wherein the first end of the probe is substantially flush with the outer surface of the outer ply.

11. The static charge drain system of claim 9, wherein the conductive film is a coating formed over the inner surface of the outer ply.

12. The static charge drain system of claim 9, wherein the second end of the probe penetrates the resistive heating film into a region between the outer ply and the inner ply.

13. The static charge drain system of claim 9, wherein the probe comprises at least one of plastic, epoxy, carbon, a metal, and a combination of any of plastic, epoxy, carbon, and a metal.

14. The static charge drain system of claim 1, wherein the probe comprises a resistance in the range of 1 Megohm to 10 Megohms.

15. The static charge drain system of claim 9, wherein the probe comprises a resistance in the range of 1 Megohm to 10 Megohms.

* * * * *